(12) United States Patent
Katayama et al.

(10) Patent No.: US 6,574,397 B2
(45) Date of Patent: Jun. 3, 2003

(54) OPTICAL MULTIPLEXER/DEMULTIPLEXER

(75) Inventors: Makoto Katayama, Yokohama (JP);
Masayuki Nishimura, Yokohama (JP);
Shigeru Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/750,282

(22) Filed: Dec. 29, 2000

(65) Prior Publication Data

US 2002/0118912 A1 Aug. 29, 2002

(51) Int. Cl.⁷ .................................................. G02B 6/00
(52) U.S. Cl. ............................ 385/46; 385/37; 359/125
(58) Field of Search ............................... 385/14–15, 37, 385/46; 359/115, 124

(56) References Cited

U.S. PATENT DOCUMENTS

| | | | |
|---|---|---|---|
| 5,002,350 A | | 3/1991 | Dragone |
| 5,841,919 A | * | 11/1998 | Akiba et al. .................. 385/37 |
| 5,982,960 A | * | 11/1999 | Akiba et al. .................. 385/24 |
| 6,069,990 A | * | 5/2000 | Okawa et al. ................ 385/43 |
| 6,122,419 A | * | 9/2000 | Kurokawa et al. ........... 385/31 |

FOREIGN PATENT DOCUMENTS

JP          07-117612          12/1995

* cited by examiner

*Primary Examiner*—Akm E. Ullah
*Assistant Examiner*—Jerry T Rahll
(74) *Attorney, Agent, or Firm*—McDermott, Will & Emery

(57) ABSTRACT

The present invention relates to an optical multiplexer/demultiplexer comprising a structure for effectively lowering the crosstalk between adjacent signal channels, thereby realizing excellent wavelength multi/demultiplexing characteristics. The optical multiplexer/demultiplexer is designed such that, while adjacent channel waveguides are allowed to have optical path length differences different from each other, effective optical path length differences become constant between optical paths traveling by way of the channel waveguides adjacent each other in optical paths including slab waveguides as a whole, whereby the structure for connecting channel waveguides to flat connecting end faces of slab waveguides can be changed arbitrarily without being restricted by multi/demultiplexing conditions. As a result, it becomes easier to design the arrangement of channel waveguides, and their layout attains a higher degree of freedom, which makes it possible to design a structure for effectively lowering the crosstalk between adjacent signal channels.

9 Claims, 7 Drawing Sheets

OPTICAL MULTIPLEXER/DEMULTIPLEXER

BACKGROUND OF THE INVENTION

1. Field of the Invention

The present invention relates to an arrayed waveguide grating (AWG) type optical multiplexer/demultiplexer which is employable as a wavelength-selecting device in a wavelength division multiplexing (WDM) transmission system.

2. Related Background Art

AWG type optical multiplexer/demultiplexers (hereinafter referred to as AWG circuits) are widely in use as a wavelength filter, which can take out or insert a specific wavelength upon interference, for a wavelength-selecting device in WDM transmission systems. Also, since the AWG circuits can be realized by general fine processing procedures such as lithography or etching without necessitating the machining as precise as that of diffraction gratings or the forming of multilayer films as precise as that of interference films, they are expected to develop as a main optical device in future WDM transmission systems together with their capability of assembling with other optical waveguide devices.

Such an AWG circuit has a structure in which an input waveguide, an input slab waveguide, a plurality of channel waveguides having respective lengths different from each other (phased array), an output slab waveguide, and a plurality of output waveguides are integrally formed on a single substrate and are covered with cladding glass.

In particular, U.S. Pat. No. 5,002,350 discloses an optical multiplexer/demultiplexer in which, among a plurality of channel waveguides, those adjacent each other have a constant optical path length difference therebetween. At respective portions where the channel waveguides connect with the input and output slab waveguides, in order to improve the wavelength multi/demultiplexing performances, the end parts of channel waveguides are arranged at equally spaced intervals along an arc having a predetermined radius or each of the end faces of input and output slab waveguides to which the end parts of channel waveguides are connected at equally spaced intervals is processed so as to match an arc having the predetermined radius.

SUMMARY OF THE INVENTION

The inventors have studied the conventional optical multiplexer/demultiplexers and, as a result, have found problems as follows. Namely, if the end parts of channel waveguides are arranged like an arc, then the convergence of light outputted from those located in peripheral portions to the slab waveguides may deteriorate under the influence of aberration and the like, while the convergence of light outputted from those located near the center thereof is fully maintained. In addition, if the end parts of channel waveguides are arranged at equally spaced intervals along an arc, then the convergence of light outputted from the channel waveguides located in peripheral portions in particular to the slab waveguides will further deteriorate due to interactions between adjacent channel waveguide. As a result, among the output waveguides provided so as to correspond to respective signal channels in the conventional optical multiplexer/demultiplexers, crosstalk between adjacent signal channels may be remarkable in the output waveguides located in the periphery in particular, whereas there has been a technical limit to lowering the crosstalk.

In order to overcome problems such as those mentioned above, it is an object of the present invention to provide an optical multiplexer/demultiplexer comprising a structure which can effectively lower the crosstalk between adjacent signal channels among output waveguides provided so as to correspond to respective signal channels, in the output waveguides located in the periphery in particular, thereby realizing excellent wavelength multi/demultiplexing characteristics.

The optical multiplexer/demultiplexer according to the present invention is an AWG type optical multiplexer/demultiplexer, employable as a wavelength-selecting device in a WDM transmission system, comprising a substrate, and at least one input waveguide, a first slab waveguide, n ($\geq 3$) channel waveguides, a second slab waveguide, and a plurality of output waveguides provided for respective signal channels, which are disposed on the substrate.

In the optical multiplexer/demultiplexer according to the present invention, the first and second slab waveguides have respective predetermined slab lengths. In general, a slab length corresponds to the focal length of the optical input end functioning as the lens surface of the respective slab waveguide. The input waveguide is a waveguide for guiding to the first slab waveguide individual signals having respective channel wavelengths set at predetermined wavelength intervals as signal channels, and has an output end optically connected to an optical input end face of the first slab waveguide. The n channel waveguides are waveguides having lengths different from each other, and are two-dimensionally arranged on the substrate while in a state where an optical input end of each channel waveguide is optically connected to an optical output end face of the first slab waveguide so as to sandwich the first slab waveguide together with the input waveguide whereas an optical output end of each channel waveguide is optically connected to an optical input end face of the second slab waveguide so as to sandwich the second slab waveguide together with the output waveguides. The output waveguides are waveguides two-dimensionally arranged on the substrate while in a state where respective optical input ends thereof are optically connected to an optical output end face of the second slab waveguide, and are used for separately taking out signals having respective channel wavelengths set at predetermined wavelength intervals.

In particular, in the optical multiplexer/demultiplexer according to the present invention, at least one of the optical output end face of the first slab waveguide and the optical input end face of the second slab waveguide each connected to the n channel waveguides is processed flat so as to extend along a line intersecting the n channel waveguides. As a consequence, among the n channel waveguides, those adjacent each other have optical path length differences different from each other.

Specifically, with respect to the average value obtained from respective optical path length differences between all adjacent channel waveguides in the n channel waveguides, it is preferred that the maximum deviation of optical path length difference between adjacent channel waveguides in the n channel waveguides be set to 3% or more. It means that, letting $\Delta L_k$ (k=1 to (n−1)) be each optical path length difference between adjacent channel waveguides, $\Delta L_{MAX}$ be the maximum optical path length difference (or minimum optical path length difference) between adjacent channel waveguides, and $\Delta L_{AVE}$ be the average value of optical path length difference, at least the deviation η (maximum deviation) of maximum optical path length difference $\Delta L_{MAX}$ with respect to the average value $\Delta L_{AVE}$ satisfies the following condition:

$$\eta = \frac{|\Delta L_{AVE} - \Delta L_{MAX}|}{\Delta L_{AVE}} \geq 0.03$$

where $$\Delta L_{AVE} = \frac{\sum_{k=1}^{n-1} \Delta L_k}{n-1}.$$

Figure 4:
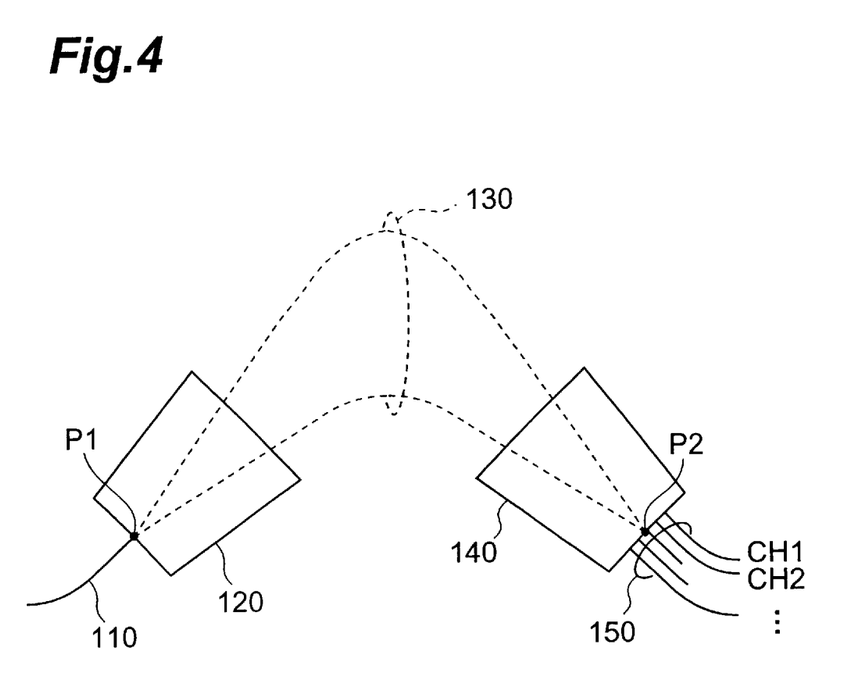
FIG. 4 is a plan view for explaining structural characteristics of the optical multiplexer/demultiplexer according to the present invention, schematically illustrating its waveguide structure from the optical input portion to optical output portion.

Here, the optical multiplexer/demultiplexer according to the present invention is designed such that, though adjacent channel waveguides have optical path length differences different from each other, effective optical path length differences become constant between optical paths extending from the center of optical input end face of the first slab waveguide to the center of optical output end face of the second slab waveguide by way of the channel waveguides adjacent each other in order to realize wavelength multi/demultiplexing functions as a whole. Namely, as shown in FIG. 4, letting L(m) be the physical optical path length from the center P1 of optical input end face of the first slab waveguide to the center P2 of optical output end face of the second slab waveguide by way of the m-th ($2 \leq m \leq n$) channel waveguide, $n_{eff}(m)$ be the effective refractive index of the m-th channel waveguide, L(m-1) be the physical optical path length from the center P1 of optical input end face of the first slab waveguide to the center P2 of optical output end face of the second slab waveguide by way of the (m-1)-th channel waveguide, and $n_{eff}(m-1)$ be the effective refractive index of the (m-1)-th channel waveguide, the integrated value of product of physical optical path length and effective refractive index along optical paths from P1 to P2 satisfies the following condition:

$$\int_{P1}^{P2} L(m) \cdot n_{eff}(m) dx - \int_{P1}^{P2} L(m-1) \cdot n_{eff}(m-1) dx = \text{constant}$$

between the m-th and (m-1)-th channel waveguides adjacent each other as a wavelength multi/demultiplexing condition in the optical multiplexer/demultiplexer. Here, among the n channel waveguides, the optical path length difference $\Delta L_n$ between those adjacent each other is given by the following expression:

$$\Delta L_0 = f_0 \cdot \left(1 - \frac{1}{\cos\theta_P}\right)$$

where
- $\Delta L_0$ is the theoretical value of the maximum optical path length difference for enabling the channel waveguides to function as a diffraction grating;
- $f_0$ is the maximum distance between the center of optical input end face of first slab waveguide to the optical input ends of channel waveguides or the maximum distance between the optical output ends of channel waveguides to the center of optical output end face of second slab waveguide; and
- $\theta P$ is the angle formed between the P-th (P–1, 2, ..., n) channel waveguide and a normal of the optical output end face of first slab waveguide or optical input end face of second slab waveguide.

As mentioned above, the optical multiplexer/demultiplexer according to the present invention is designed such that, while channel waveguides adjacent each other are allowed to have optical path length differences different from each other, optical paths traveling by way of respective channel waveguides adjacent each other have a constant effective optical path length difference as the optical paths including the slab waveguides in total. It means that the structure for connecting channel waveguides to the flat connecting end face (at least one of the optical output end face of first slab waveguide and the optical input end face of second slab waveguide) can be changed arbitrarily without being restricted by multi/demultiplexing conditions. As a result, it becomes easier to design the arrangement of channel waveguides, and their layout attains a higher degree of freedom, which makes it possible to design a structure for effectively lowering the crosstalk between adjacent signal channels in output waveguides located in the periphery in particular among the output waveguides provided so as to correspond to respective signal channels.

In order to adjust the focal position in the first slab waveguide in the optical multiplexer/demultiplexer according to the present invention, it is preferred that the channel waveguides connected to the optical output end face of the first slab waveguide be arranged such that the optical input ends thereof are directed to the center of optical input end face of the first slab waveguide. Also, in order to adjust the focal position in the second slab waveguide, it is preferred that the channel waveguides connected to the optical input end face of the second slab waveguide be arranged such that the optical output ends thereof are directed to the center of optical output end face of the second slab waveguide. Namely, with respect to at least one flat end face of the optical output end face of first slab waveguide and the optical input end face of second slab waveguide, the channel waveguides connected to this flat end face form respective angles different from each other in the optical multiplexer/demultiplexer according to the present invention. In other words, the channel waveguides are arranged on the substrate such that, among tip portions thereof including the optical input ends, those adjacent each other have intervals different from each other. Also, the channel waveguides are arranged on the substrate such that, among tip portions thereof including the optical output ends, those adjacent each other have intervals different from each other.

BRIEF DESCRIPTION OF THE DRAWINGS

FIG. 5A is a view showing the structure near a slab waveguide of a sample manufactured as an embodiment of the optical multiplexer/demultiplexer according to the present invention, whereas

DESCRIPTION OF THE PREFERRED EMBODIMENTS

In the following, embodiments of the optical multiplexer/demultiplexer according to the present invention will be explained in detail with reference to FIGS. 1 to 4, 5A, 5B, and 6 to 9. Among the drawings, parts identical to each other will be referred to with numerals identical to each other without repeating their overlapping explanations.

Figure 1:
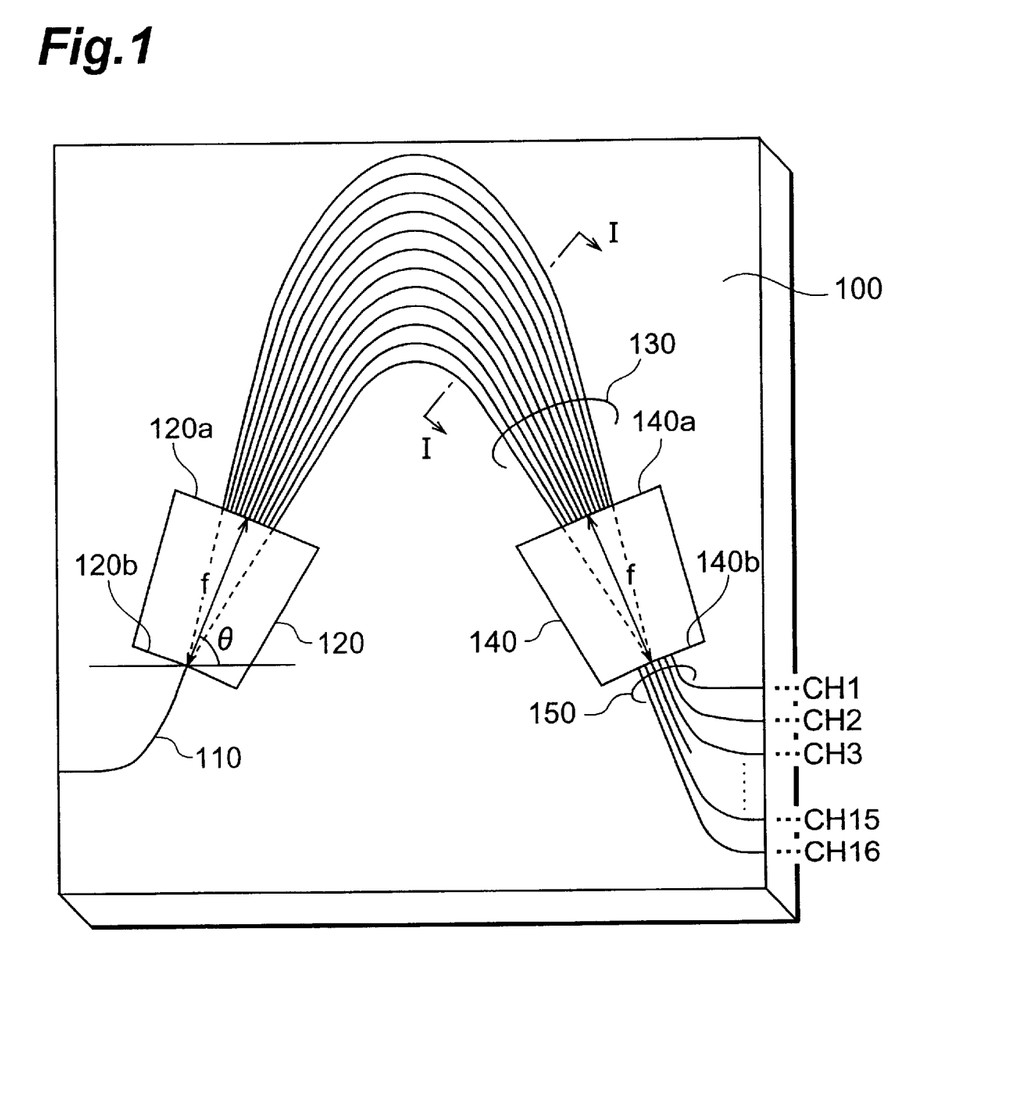
FIG. 1 is a plan view showing the schematic configuration of the optical multiplexer/demultiplexer according to the present invention.

FIG. 1 is a plan view showing the configuration of an AWG circuit as the optical multiplexer/demultiplexer according to the present invention. As depicted, this optical multiplexer/demultiplexer is an optical component in which optical waveguide parts are integrally formed on a silica glass substrate 100. Namely, at least one input waveguide 110, a first slab waveguide 120 (input slab waveguide), n ($\geq$3)channel waveguides 130, a second waveguide 140 (output slab waveguide), and output waveguides 150 corresponding to respective signal channels CH1, CH2, . . . CH15, and CH16 are disposed on the substrate 100.

Figure 2:
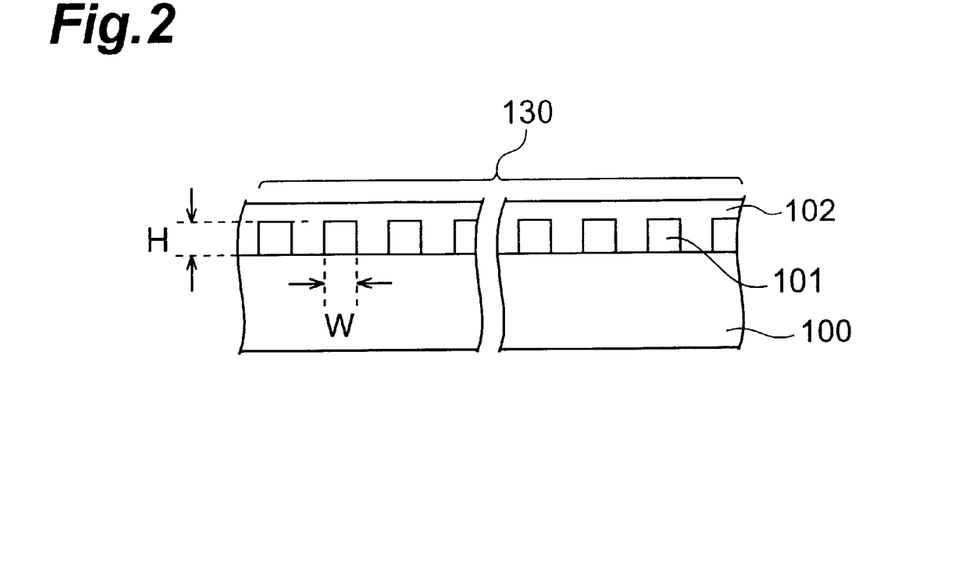
FIG. 2 is a view showing the cross-sectional structure of the optical multiplexer/demultiplexer taken along the line I—I shown in FIG. 1.

Each of the waveguide parts is doped with $GeO_2$, whereas the doping amount of $GeO_2$ is such that the relative refractive index difference between the substrate 100 and the waveguide parts is 0.5% or more in order to make it possible to lower the radius of curvature of channel waveguides 130 (improve the light confinement efficiency). The substrate 100 is not restricted to the silica glass substrate, and may be constituted by a silicon substrate and a glass layer having a thickness of ten to several tens of micrometers formed on the silicon substrate. Similar operations and effects are also obtained when waveguides doped with $GeO_2$ are formed on this glass layer. FIG. 2 is a view showing the cross-sectional structure of AWG circuit taken along the line I—I of FIG. 1, in which a core 101 (having a width W and a thickness (height) H) to be come a waveguide and a cladding 102 covering the core 101 are disposed on the substrate 100.

The first slab waveguide 120 has a flat optical output end face 120a, disposed at an angle $\theta$ with respect to the incident angle of light fed to the optical multiplexer/demultiplexer, to which the optical input ends of channel waveguides 130 are optically connected; and an optical input end face 120b to which the optical output end of input waveguide 110 is optically connected. The second slab waveguide 140 has a flat optical input end face 140a to which the optical output ends of channel waveguides 130 are optically connected, and an optical output end face 140b to which the optical input ends of output waveguides 150 are optically connected. Each of the first and second slab waveguides 120, 140 has a slab length f. Here, the slab length corresponds to the focal length of the convex lens surface located at the optical input end face in each of the first and second slab waveguides 120, 140.

The input waveguide 110 is a waveguide for guiding to the first slab waveguide 120 individual signals having respective channel wavelengths which are set at predetermined wavelength intervals as signal channels, and has an output end optically connected to the optical input end face 120b of first slab waveguide 120. The channel waveguides 130 are waveguides having respective lengths different from each other, and are two-dimensionally arranged on the substrate 100. The channel waveguides 130 are optically connected to the optical output end face 120a of first slab waveguide 120 so as to sandwich the first slab waveguide 120 together with the input waveguide 110, and are optically connected to the optical input end face 140a of second slab waveguide 140 so as to sandwich the second slab waveguide 140 together with the output waveguides 150. The output waveguides 150 are waveguides two-dimensionally arranged on the substrate 100 while in a state where respective optical output end face 140a of second slab waveguide 140, so as to correspond to individual signals having respective channel wavelengths set at predetermined wavelength intervals, i.e., so as to correspond to the respective signal channels.

Though the optical multiplexer/demultiplexer shown in FIG. 1 is explained as an AWG circuit, in which light successively propagates through the input waveguide 110, first slab waveguide 120, channel waveguides 130, second slab waveguide 140, and output waveguides 150, enabling 16 channels of signals to be separated from each other, a plurality of input waveguides may be provided so as to correspond to the respective signal channels, thereby realizing an AWG circuit which enables wavelength multiplexing.

Figure 3:
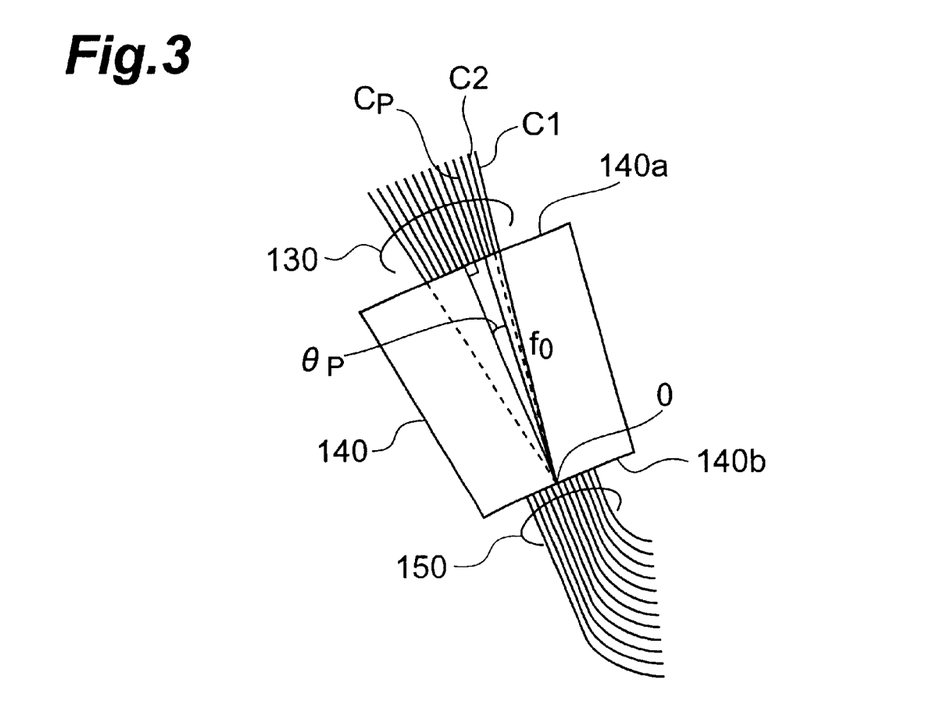
FIG. 3 is a plan view for explaining structural characteristics of the optical multiplexer/demultiplexer according to the present invention, mainly illustrating a waveguide structure of its optical output portion.

FIG. 3 is a plan view for explaining structural characteristics of the optical multiplexer/demultiplexer according to the present invention, mainly illustrating a waveguide structure of its optical output portion. Though the waveguide structure near the second slab waveguide 140 is shown in FIG. 3, the waveguides near the first slab waveguide 120 may also comprise a similar structure.

In the optical multiplexer/demultiplexer according to the present invention, for adjusting the focal position in the second slab waveguide 140, the channel waveguides 130 connected to the optical input end face 140a of second slab waveguide 140 are arranged such that the optical output ends thereof are directed to the center O of optical output end face 140b of the second slab waveguide 140. Here, since the optical input end face 140a of second slab waveguide 140 is processed flat, thus connected channel waveguides 130 have connecting angles (angles formed between the channel waveguides 130 and optical input end face 140a) different from each other at the optical output end of channel waveguide 130. Similarly, it is preferred that the channel waveguides 130 connected to the optical output end face 120a of first slab waveguide 120 be arranged such that the optical input ends thereof are directed to the center of optical input end face 120b of the first slab waveguide 120.

In other words, among the channel waveguides 130 in the optical multiplexer/demultiplexer according to the present invention, those adjacent each other are arranged on the substrate such that tip portions thereof including the optical input ends have intervals different from each other. Also, among the channel waveguides 130, those adjacent each other may be arranged on the substrate such that tip portions thereof including the optical output ends have intervals different from each other.

The optical multiplexer/demultiplexer according to the present invention is designed such that, though adjacent channel waveguides are allowed to have optical path length differences different from each other, effective optical path length differences become constant between optical paths extending from the center P1 of optical input end face 120b of the first slab waveguide 120 to the center P2 of optical output end face 140b of the second slab waveguide 140 by way of the channel waveguides 130 adjacent each other as shown in FIG. 4 in order to realize wavelength multi/demultiplexing functions as a whole. Namely, letting L(m) be the physical optical path length from the center P1 of optical input end face 120b of the first slab waveguide 120 to the center P2 of optical output end face 140b of the second slab waveguide 140 byway of the m-th (2≦m≦n) channel waveguide, $n_{eff}$(m) be the effective refractive index of the m-th channel waveguide, L(m−1) be the physical optical path length from the center P1 of optical input end face 120b of the first slab waveguide 120 to the center P2 of optical output end face 140b of the second slab waveguide 140 by way of the (m−1)-th channel waveguide, and $n_{eff}$(m−1) be the effective refractive index of the (m−1)-th channel waveguide, the integrated value of product of physical optical path length and effective refractive index along optical paths from P1 to P2 satisfies the following condition:

$$\int_{P1}^{P2} L(m) \cdot n_{eff}(m) dx - \int_{P1}^{P2} L(m-1) \cdot n_{eff}(m-1) dx = \text{constant}$$

between the m-th and (m−1)-th channel waveguides adjacent each other as a wavelength multi/demultiplexing condition in the optical multiplexer/demultiplexer. Here, among the n channel waveguides, the optical path length difference $\Delta L_n$ between those adjacent each other is given by the following expression:

$$\Delta L_0 = f_0 \cdot \left(1 - \frac{1}{\cos \theta_P}\right)$$

where
$\Delta L_0$ is the theoretical value of the maximum optical path length difference for enabling the channel waveguides to function as a diffraction grating;
$f_0$ is the maximum distance between the center of optical input end face of first slab waveguide to the optical input ends of channel waveguides or the maximum distance between the optical output ends of channel waveguides to the center of optical output end face of the second slab waveguide; and
$\theta P$ is the angle formed between the P-th (P=1, 2, ..., n) channel waveguide and a normal of the optical output end face of first slab waveguide or optical input end face of second slab waveguide.

As mentioned above, the optical waveguides according to the present invention are designed such that, while channel waveguides adjacent each other are allowed to have optical path length differences different from each other, optical paths traveling by way of respective channel waveguides adjacent each other have a constant effective optical path length difference as the optical paths including the first and second slab waveguides 120, 140 in total. It means that the structure for connecting channel waveguides 130 to at least one flat connecting end face of the optical output end face 120a of first slab waveguide 120 and the optical input end face 140a of second slab waveguide 140 can be changed arbitrarily without being restricted by multi/demultiplexing conditions. As a result, it becomes easier to design the arrangement of channel waveguides 130, and their layout attains a higher degree of freedom, which makes it possible to design a structure for effectively lowering the crosstalk between adjacent signal channels in output waveguides located in the periphery in particular among the output waveguides provided so as to correspond to respective signal channels.

The inventors designed an AWG circuit capable of separating 16 channels of signals having a signal wavelength interval Δλ of 100 GHz and a center channel wavelength (CH8) of 1550.918 nm.

In thus designed AWG circuit, the relative refractive index difference between the substrate 100 and each waveguide part is 0.75%, each waveguide has a core width W of 6.0 μm and a core thickness H of 6.0 μm, each of the first and second slab waveguides 120, 140 has a slab length f of 9086.17 μm, the substrate 100 has a size of 20 mm×20 mm with a thickness of 0.5 mm, the channel waveguides 130 have an interval of 15.0 μm, the number of channel waveguides 130 is 80, the installation angle θ of second slab waveguide 120 is 80 degrees, and the output waveguides 150 have an interval of 20 μm. Among optical paths from the center P1 of optical input end face 120a of the first slab waveguide 120 to the center P2 of optical output end face 140b of the second slab waveguide 140 by way of the channel waveguides 130, the effective optical path length difference ΔL is set to 63.0 μm.

Figure 5A:
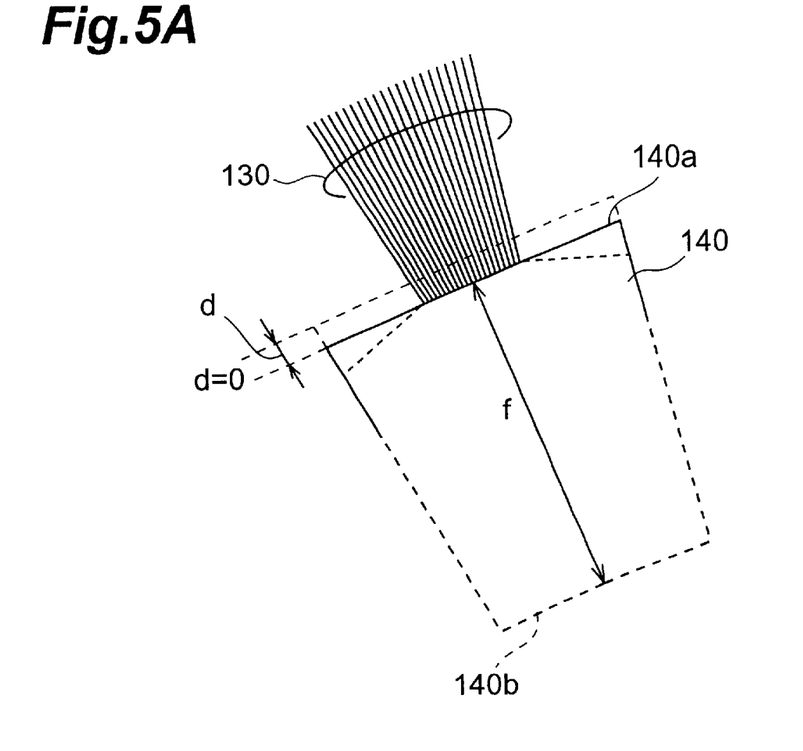

In this first sample designed as an AWG circuit according to the present invention, the optical output end face 140a of second slab waveguide 140 is processed flat as shown in FIG. 5A (as with the optical input end face 120a of first slab waveguide 120).

Figure 5B:
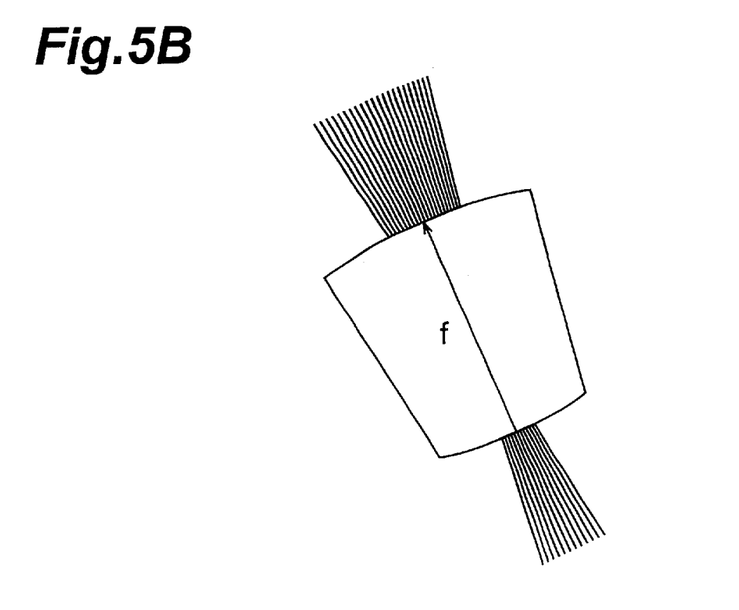
FIG. 5B is a plan view showing the configuration near a slab waveguide of a sample manufactured as a comparative example.

In a second sample of AWG circuit designed as a comparative example, by contrast, connecting end faces to be connected to the channel waveguide are processed like an arc as shown in FIG. 5B.

Figure 6:
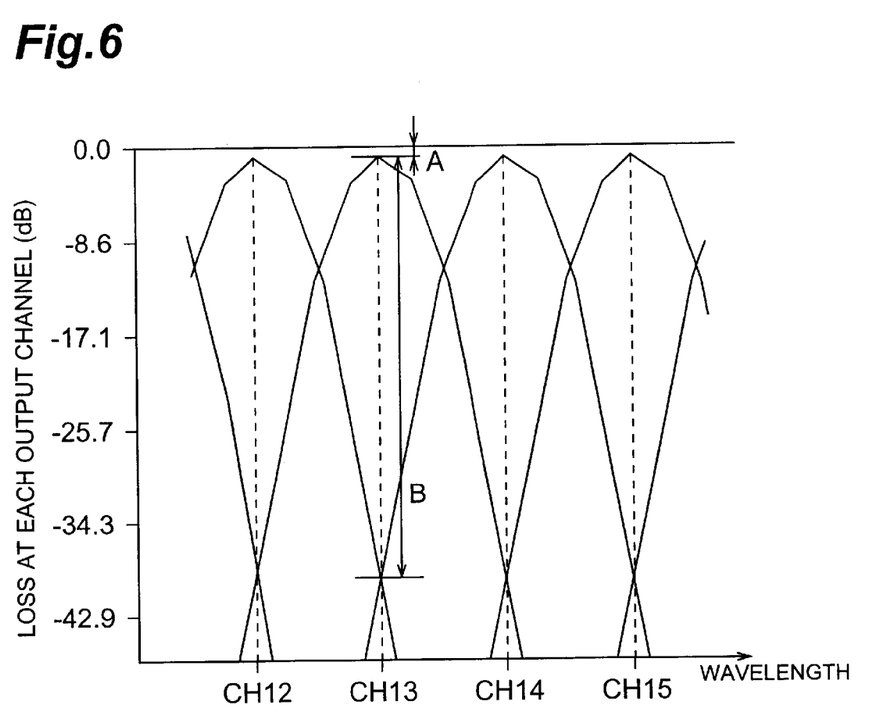
FIG. 6 is a loss spectrum measured at each output waveguide (output channel) of the sample (FIG. 5A) manufactured as an embodiment of the optical multiplexer/demultiplexer according to the present invention.

Among the output waveguides 150 provided so as to correspond to the signal channels CH1 to CH16 concerning the first sample, the inventors measured a loss spectrum of signal channels CH12 to CH15 taken out from the output waveguides in a peripheral portion in particular. FIG. 6 is the loss spectrum of signal channels CH12 to CH15 taken out from the output waveguides located in the peripheral portion. As can be seen from FIG. 6, at the center channel wavelength of each of signal channels CH12 to CH15, the fluctuation in loss A measured at each corresponding output waveguide is lowered, whereas the loss in crosstalk component (A+B) from adjacent signal channels is fully suppressed.

Concerning the first sample, while changing the distance of the end face 140a connecting with the channel waveguides 130 in the second slab waveguide 140 from its opposite connecting end face 140b by a width d (0 to 1000 μm) with reference to the position (d=0) where the connecting end faces 140a, 140b are separated from each other by the slab length f as shown in FIG. 5A, the inventors measured the insertion loss at the signal channel CH15 (FIG. 7) and the crosstalk (dB) between output waveguides 150 (output channels). As a conventional level, each of FIGS. 7 and 8 also shows data of the second sample comprising slab waveguides having the structure shown in FIG. 5B.

Figure 7:
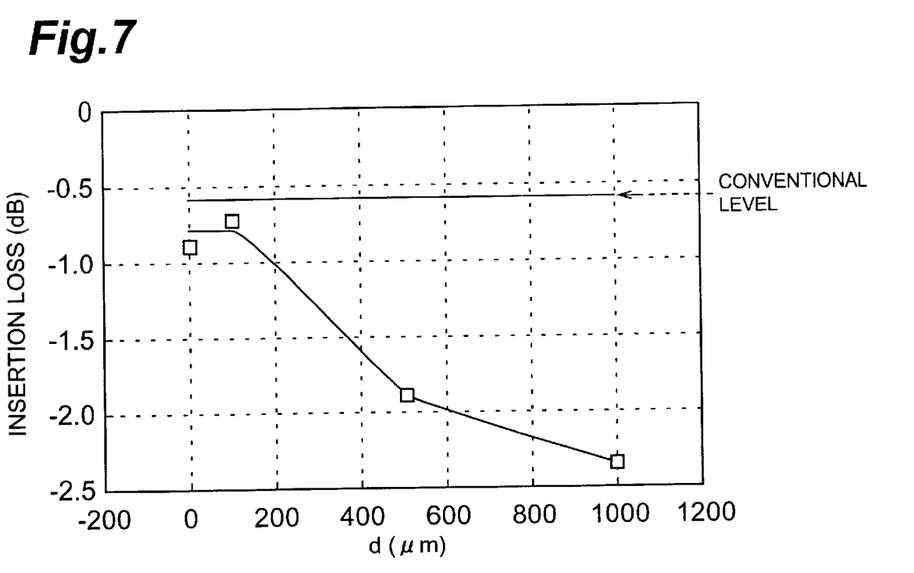
FIG. 7 is a graph showing the insertion loss (dB) concerning a slab waveguide (FIG. 5A) of the sample manufactured as an embodiment of the optical multiplexer/demultiplexer according to the present invention when the distance between connecting end faces is changed by a width d ($\mu$m) with reference to the position (d=0) where the distance between the connecting end faces coincides with the slab length f.

As can be seen from FIG. 7, the first sample can suppress the insertion loss to a level on a par with the conventional level if the width d is 200 μm or less, whereas the insertion loss remarkably increases under the influence of coupling between the channel waveguides 130 and second slab waveguide 140 if the width d exceeds 200 μm. Hence, the fluctuation of width d as a manufacturing tolerance is unproblematic in practice if it does not exceed 200 μm.

Figure 8:
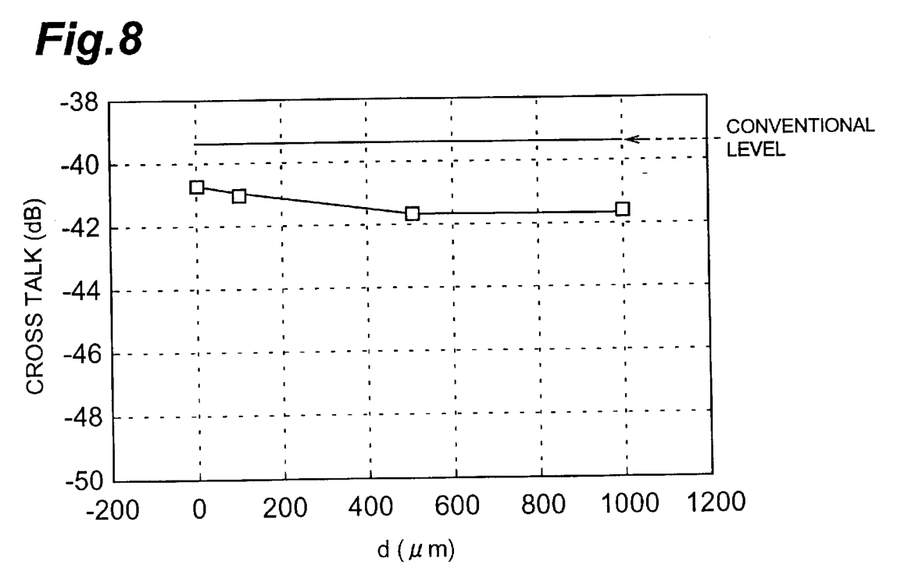
FIG. 8 is a graph showing the crosstalk (dB) between output waveguides (output channels) concerning the slab waveguide (FIG. 5A) of the sample manufactured as an embodiment of the optical multiplexer/demultiplexer according to the present invention when the distance between connecting end faces is changed by a width d ($\mu$m) with reference to the position (d=0) where the distance between the connecting end faces coincides with the slab length f.

As can be seen from FIG. 8, on the other hand, the crosstalk between adjacent channels is lower than the conventional level of second sample regardless of the change in width d.

Further, the inventors measured crosstalk while changing the degree of fluctuation (deviation) in optical path length difference between adjacent channel waveguides. Here, basic measurement conditions are similar to those mentioned above. The samples prepared are a third sample having the structure shown in FIG. 5A with a width d set to 100 μm, a fourth sample having the structure shown in FIG. 5A with a width d set to 1000 μm, and the second sample prepared as a comparative example. The fluctuation (defined by the maximum deviation η) in optical path length difference between adjacent waveguides is given by the following expression with respect to the average value $\Delta L_{AVE}$ obtained from all the optical path length differences $\Delta L_k$ (k=1 to (n−1)) between adjacent channel waveguides in the channel waveguides 130:

$$\eta = \frac{|\Delta L_{AVE} - \Delta L_{MAX}|}{\Delta L_{AVE}}$$

where $$\Delta L_{AVE} = \frac{\sum_{k=1}^{n-1} \Delta L_k}{n-1}$$

wherein $\Delta L_{AVE}$ is the maximum optical path length difference (or the minimum optical path length difference).

The maximum deviation is 0.042 (=4.2%) in the third sample and 0.046 (=4.6%) in the fourth sample. In the second sample, which is a comparative example, the maximum deviation is inevitably 0% since the optical path length difference between adjacent channel waveguides is constant.

Figure 9:
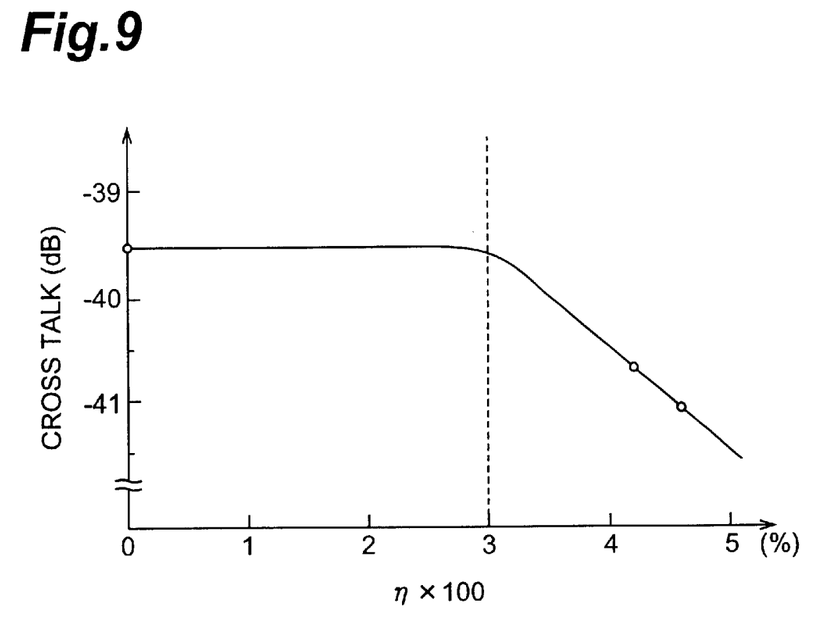
FIG. 9 is a graph showing the crosstalk (dB) between output waveguides (output channels) concerning the slab waveguide (FIG. 5A) of the sample manufactured as an embodiment of the optical multiplexer/demultiplexer according to the present invention when the maximum deviation $\eta$ of optical path length difference between adjacent channel waveguides is changed.

FIG. 9 is a graph showing results of measurement of crosstalk in the above-mentioned second to fourth embodiments. As can be seen from this graph, crosstalk begins to decrease remarkably when the maximum deviation η exceeds about 0.03 (=3%). In view of this, the maximum deviation of optical path length difference between adjacent channel waveguides in the channel waveguides 130 in the optical multiplexer/demultiplexer according to the present invention is set to 3% or more with respect to the average value obtained from all the optical path length differences between the adjacent channel waveguides in the channel waveguides 130.

As in the foregoing, the present invention is designed such that, while channel waveguides adjacent each other are allowed to have optical path length differences different from each other, optical paths traveling by way of respective channel waveguides adjacent each other have a constant effective optical path length difference as the optical paths including the slab waveguides in total. Therefore, the structure for connecting channel waveguides to flat connecting end faces of slab waveguides can be changed arbitrarily without being restricted by multi/demultiplexing conditions. As a result, it becomes easier to design the arrangement of channel waveguides, and their layout attains a higher degree of freedom, which is effective in making it possible to design a structure for further lowering the crosstalk between adjacent signal channels in output waveguides located in the periphery in particular among the output waveguides provided so as to correspond to respective signal channels.

What is claimed is:

1. An optical multiplexer/demultiplexer comprising:
   a substrate;
   first and second slab waveguides, each having a predetermined slab length, disposed on said substrate;
   at least one input waveguide, disposed on said substrate, having an optical output end optically connected to an optical input end face of said first slab waveguide;
   a plurality of output waveguides two-dimensionally arranged on said substrate while in a state where respective optical input ends thereof are optically connected to an optical output end face of said second slab waveguide, said output waveguides being provided so as to correspond to respective signal channels having wavelengths different from each other; and
   n (≧3) channel waveguides two-dimensionally arranged on said substrate while in a state where an optical input end of each channel waveguide is optically connected to an optical output end face of said first slab waveguide so as to sandwich said first slab waveguide together with said input waveguide whereas an optical output end of each channel waveguide is optically connected to an optical input end face of said second slab waveguide so as to sandwich said second slab waveguide together with said output waveguides, said channel waveguides having respective lengths different from each other;
   wherein a first channel waveguide selected from said n channel waveguides and a second channel waveguide adjacent said first channel waveguide on one side thereof have an optical path length difference therebetween different from that between said first channel waveguide and a third channel waveguide adjacent said first channel waveguide on the other side thereof, and
   wherein at least one of said optical output end face of said first slab waveguide and said optical input end face of said second slab waveguide each connected to said n channel waveguides has a form extending along a straight line intersecting said n channel waveguides.

2. An optical multiplexer/demultiplexer according to claim 1, wherein adjacent channel waveguides in said n channel waveguides have a maximum deviation of optical path length difference of 3% or more with respect to an average value obtained from all the optical path length differences between adjacent channels in said n channel waveguides.

3. An optical multiplexer/demultiplexer according to claim 1, wherein, with respect to at least one of said optical output end face of said first slab waveguide and said optical input end face of said second slab waveguide, said first to third channel waveguides connected to said one end face form angles different from each other.

4. An optical multiplexer/demultiplexer according to claim 3, wherein said n channel waveguides connected to said optical output end face of said first slab waveguide are arranged such that said optical input ends thereof are directed to a center of said optical input end face of said first slab waveguide.

5. An optical multiplexer/demultiplexer according to claim 4, wherein said n channel waveguides are arranged on said substrate such that, among tip portions thereof including said optical input ends, those adjacent each other have intervals different from each other.

6. An optical multiplexer/demultiplexer according to claim 3, wherein said n channel waveguides connected to said optical input end face of said second slab waveguide are arranged such that said optical output ends thereof are directed to a center of said optical output end face of said second slab waveguide.

7. An optical multiplexer/demultiplexer according to claim 6, wherein said n channel waveguides are arranged on said substrate such that, among tip portions thereof including said optical output ends, those adjacent each other have intervals different from each other.

8. An optical multiplexer/demultiplexer comprising:
a substrate;
first and second slab waveguides, each having a predetermined slab length, disposed on said substrate;
at least one input waveguide, disposed on said substrate, having an optical output end optically connected to an optical input end face of said first slab waveguide;
a plurality of output waveguides two-dimensionally arranged on said substrate while in a state where respective optical input ends thereof are optically connected to an optical output end face of said second slab waveguide, said output waveguides being provided so as to correspond to respective signal channels having wavelengths different from each other; and
n ($\geq 3$) channel waveguides two-dimensionally arranged on said substrate while in a state where an optical input end of each channel waveguide is optically connected to an optical output end face of said first slab waveguide so as to sandwich said first slab waveguide together with said input waveguide whereas an optical output end of each channel waveguide is optically connected to an optical input end face of said second slab waveguide so as to sandwich said second slab waveguide together with said output waveguides, said channel waveguides having respective lengths different from each other; and
wherein a first channel waveguide selected from said n channel waveguides and a second channel waveguide adjacent said first channel waveguide on one side thereof have an optical path length difference therebetween different from that between said first channel waveguide and a third channel waveguide adjacent said first channel waveguide on the other side thereof,
wherein, among said n channel waveguides, the optical path length difference $\Delta L_n$ between those adjacent each other is given by the following expression:

$$\Delta L_0 - f_0 \cdot \left(1 - \frac{1}{\cos\theta_P}\right)$$

where
$\Delta L_0$ is the theoretical value of the maximum optical path length difference for enabling the channel waveguides to function as a diffraction grating;

$f_0$ is the maximum distance between the center of optical input end face of first slab waveguide to the optical input ends of channel waveguides or the maximum distance between the optical output ends of channel waveguides to the center of optical output end face of second slab waveguide; and $\theta p$ is the angle formed between the P⁻th (P–1, 2, . . . , n) channel waveguide and a normal of the optical output end face of first slab waveguide or optical input end face of second slab waveguide.

9. An optical multiplexer/demultiplexer comprising:
a substrate;
first and second slab waveguides, each having a predetermined slab length, disposed on said substrate;
at least one input waveguide, disposed on said substrate, having an optical output end optically connected to an optical input end face of said first slab waveguide;
a plurality of output waveguides two-dimensionally arranged on said substrate while in a state where respective optical input ends thereof are optically connected to an optical output end face of said second slab waveguide, said out put waveguides being provided so as to correspond to respective signal channels having wavelengths different from each other; and
n ($\geq 3$) channel waveguides two-dimensionally arranged on said substrate while in a state where an optical input end of each channel waveguide is optically connected to an optical output end face of said first slab waveguide so as to sandwich said first slab waveguide together with said input waveguide whereas an optical output end of each channel waveguide is optically connected to an optical input end face of said second slab waveguide so as to sandwich said second slab waveguide together with said output waveguides, said channel waveguides having respective lengths different from each other;
wherein a first channel waveguide selected from said n channel waveguides and a second channel waveguide adjacent said first channel waveguide on one side thereof have an optical path length difference therebetween different from that between said first channel waveguide and a third channel waveguide adjacent said first channel waveguide on the other side thereof, and
wherein, letting L(m) be the physical optical path length from the center P1 of optical input end face of said first slab waveguide to the center P2 of optical output end face of said second slab waveguide by the way of the m⁻th ($2\leq m \leq n$) channel waveguide, $n_{\it eff}(m)$ be the effective refractive index of the mth channel waveguide, L(m+1) be the physical optical path length from the center P1 of optical input end face of said first slab waveguide to the center P2 of optical output end face of said second slab waveguide by way of the (m⁻¹1)⁻th channel waveguide, and the $n_{\it eff}(m⁻1)$ be the effective (m⁻1)⁻channel waveguide, the integrated value of product of physical optical path length and effective refractive index along optical paths from P1 to P2 satisfies the following condition:

$$\int_{P1}^{P2} L(m) - n_{\it eff}(m) dx - \int_{P1}^{P2} L(m-1) - n_{\it eff}(m-1) dx = \text{constant}$$

between the m⁻th and (m⁻1)⁻th channel waveguides adjacent each other as a wavelength multi-demultiplexing condition in said optical multiplexer/demultiplexer.

* * * * *